(12) United States Patent
Nieminen

(10) Patent No.: US 12,445,091 B2
(45) Date of Patent: Oct. 14, 2025

(54) SOLAR PANEL SYSTEM AND A METHOD FOR COOLING SOLAR PANELS

(71) Applicant: FF-FUTURE OY, Salo (FI)

(72) Inventor: Henri Nieminen, Salo (FI)

(73) Assignee: FF-FUTURE OY, Salo (FI)

( * ) Notice: Subject to any disclaimer, the term of this patent is extended or adjusted under 35 U.S.C. 154(b) by 83 days.

(21) Appl. No.: 18/283,967

(22) PCT Filed: Mar. 28, 2022

(86) PCT No.: PCT/FI2022/050194
§ 371 (c)(1),
(2) Date: Sep. 25, 2023

(87) PCT Pub. No.: WO2022/207971
PCT Pub. Date: Oct. 6, 2022

(65) Prior Publication Data
US 2024/0171125 A1    May 23, 2024

(30) Foreign Application Priority Data
Mar. 29, 2021    (FI) ................................. 20215356

(51) Int. Cl.
*H02S 40/42*        (2014.01)
*H02S 20/10*        (2014.01)

(52) U.S. Cl.
CPC ............ *H02S 40/425* (2014.12); *H02S 20/10* (2014.12)

(58) Field of Classification Search
None
See application file for complete search history.

(56) References Cited

U.S. PATENT DOCUMENTS

2007/0256727 A1* 11/2007 Gumm .................... H02S 20/23
                                                                    136/251
2014/0069483 A1* 3/2014 Wolter .................... F24S 25/70
                                                                    136/246

FOREIGN PATENT DOCUMENTS

| CH | 707738 B1 | 8/2015 |
| CN | 206607467 U | 11/2017 |
| EP | 3683961 A1 | 7/2020 |
| WO | 2013027186 A2 | 2/2013 |
| WO | 2016004058 A1 | 1/2016 |

OTHER PUBLICATIONS

International Search Report and Written Opinion in Application No. PCT/FI2022/050194, mailed Jul. 11, 2022, 9 pages.
Search Report in Finnish Application 20215356, dated Oct. 29, 2021, 1 page.

* cited by examiner

*Primary Examiner* — Eli S Mekhlin
(74) *Attorney, Agent, or Firm* — Muenier Carlin & Curfman LLC

(57) ABSTRACT

A solar panel system wherein solar panels are arranged on the soil, substantially in parallel with the ground surface, and at least some interspaces between the solar panels are provided with a board or boards of thermal insulation material substantially in parallel with the ground surface. A cooling pipework of the solar panel system is arranged underneath the solar panels and the boards of thermal insulation material in the soil. A cooling pipework is further arranged in at least some of the boards of thermal insulation material on the ground surface, and/or is connected to heat distribution boards on top of the boards of thermal insulation material on the ground surface.

14 Claims, 1 Drawing Sheet

SOLAR PANEL SYSTEM AND A METHOD FOR COOLING SOLAR PANELS

This is a U.S. national stage application of international application PCT/FI2022/050194 filed on Mar. 28, 2022 and claiming priority to Finnish national application No. 20215356 filed on Mar. 29, 2021.

FIELD OF THE INVENTION

The invention relates to a solar panel system and a method for cooling solar panels according to the appended independent claims.

BACKGROUND OF THE INVENTION

Solar radiation energy is converted into electric energy in a solar cell. Typically, solar cells are connected in series and installed in a framework to form so-called solar panels. In recent years, solar panels have played an increasing role in energy production.

Solar panels can only utilize a fraction of radiation from the sun. Most of the solar radiation is converted into heat in the solar panel. The heat is distributed throughout the solar panel by conduction between the different parts of the panel. In the end, the solar panel is hot throughout but the temperature of the panel is not necessarily uniform over the entire area of the panel. An increase in the temperature causes a decrease in the voltage and an increase in the current in the electric circuit of the solar panel. The voltage decreases more and the current increases correspondingly, whereby the power produced by the solar panel decreases. Consequently, a weakness of solar panels is the fact that the efficiency of the solar panel decreases as the temperature of the solar panel rises. The efficiency of solar panels varies according to the temperature of the solar cell array. The higher the temperature of the solar panel, the lower the efficiency of the solar panel. To achieve the best efficiency, the solar panel should be as cool as possible. The efficiency of solar panels is typically given at a temperature of 25° C. It is typical of solar cell materials that the power output decreases if the operating temperature of the solar cells rises above 25° C. Keeping the operating temperature lower than the above mentioned temperature improves the power output of the solar panel. Depending on the location of the solar panels and the weather conditions, the temperature of solar panels may rise to several tens of degrees Celsius. Therefore, cooling the solar panels can significantly improve their efficiency. Even a slight increase in the efficiency has a great effect on the annual energy output, particularly of large solar power plants.

The temperature of solar panels can be decreased by various methods. Typically, solar panels are installed in a sufficiently airy place in view of cooling the cell array, whereby the cell array of the solar panels can be cooled by the wind. For example, when the solar panels are slightly elevated off the base, air can flow freely underneath the solar panels. The solar panels may also be provided with cooling elements for collecting heat from the solar panel and for releasing it to the environment. Particularly in larger power plants where the solar panels are mounted on stands, either fixed at a suitable angle to the sun and/or changing their orientation according to the position of the sun, the solar panels are typically cooled by various sprinkler systems or water sprays. Cooling by water has positive effects on the efficiency of the solar panels, but spraying with water cannot provide uniform cooling throughout the area of the panel. Moreover, such stand structures are complex and expensive, and the maintenance of the systems is laborious.

In addition to decreasing the efficiency of the solar panels, high temperatures or temperature variations are a burden to the components of the solar panel, resulting in breaking down of components and shortening the service life of the solar panels.

OBJECT AND DESCRIPTION OF THE INVENTION

An object of the present invention is to reduce or even eliminate the above-mentioned problems present in prior art.

It is an aim of the present invention to provide a solar panel system by which the solar panels can be cooled in an easy and cost-efficient way and which system makes it possible to install the solar panels easily and does not require expensive and complex structures. Thus, the solar panel system according to the invention makes it possible to construct even large solar power plants with cooling systems in an easy and cost-efficient way.

To achieve this aim, the solar panel system and the method for cooling solar panels according to the invention are primarily characterized in what will be presented in the characterizing part of the respective independent claim.

The dependent claims present some preferred embodiments of the invention.

A typical solar panel system according to the invention comprises solar panels and a cooling pipework for cooling the solar panels, wherein solar panels are arranged on the ground, substantially in parallel with the ground surface, and at least some interspaces between the solar panels are provided with a board or boards of thermal insulation material substantially in parallel with the ground surface, and the cooling pipework of the solar panel system is arranged underneath the solar panels and the boards of thermal insulation material in the ground, whereby a cooling medium circulation is arranged in the cooling pipework, and the cooling pipework is further arranged to extend in at least some of the boards of thermal insulation material on the ground surface and/or is connected to heat distribution boards on top of the boards of thermal insulation material on the ground surface.

In a typical method according to the invention for cooling solar panels in a solar panel system which comprises ground-mounted solar panels extending substantially in parallel with the ground surface and a board or boards of thermal insulation material extending substantially in parallel with the ground surface and arranged in at least some interspaces between the solar panels, as well as a cooling pipework arranged underneath the solar panels and the boards of thermal insulation material in the ground, in which a cooling medium is arranged to circulate,
  the solar panels are cooled by circulating the cooling medium in the cooling pipework arranged underneath the solar panels in the ground, when the solar panels are to be cooled during their operation, and
  the cooling medium is arranged to circulate in the cooling pipework in the boards of thermal insulation material on the ground surface and/or in the heat distribution boards on top of the boards of thermal insulation material on the ground surface, when heat is to be released from the cooling medium circulation.

The solar panel system and the method for cooling solar panels according to the invention are based on installing the solar panels directly onto the ground, substantially in parallel with the ground surface, whereby no space is left between the ground surface and the solar panels for air to flow at the back side of the panels, but the cooling is provided by using a soil bed, in which the solar panels are directly installed. In the system according to the invention, a cooling pipework is arranged in the ground underneath the solar panels, and the ground is used as an element for cooling the solar panels. In the system according to the invention, boards of thermal insulation material on the ground surface help to keep the soil layer cool when the system is cooled by the cooling circulation, and furthermore, heat can be released from the cooling circulation by means of the cooling pipework and/or the heat distribution boards arranged for these boards of thermal insulation material. The cooling of the solar panel system according to the invention is based on the use of the soil layer underneath the solar panels as a heat accumulator to which heat is transferred during the daytime, and during night time heat is released from the soil layer via components of the cooling pipework arranged on the ground surface. By this cooling method according to the invention, the temperature of the solar panels can be kept low during the daytime.

The system according to the invention enables efficient cooling of the solar panels, improving their efficiency and service reliability. The system according to the invention also enables substantially uniform cooling of the solar panels throughout the surface of the solar panel. Moreover, uniform cooling of the solar panel prevents breaking of components caused by temperature variation, and extends the service life of the solar panels.

The solar panel system according to the invention is easy to install, and the carbon footprint of the solar panel system is considerably lower than that of stand structures which are conventionally used, because very little steel and concrete is needed for the system according to the invention.

Furthermore, when the solar panel system has been arranged on the ground and it forms a flat surface, as in the invention, the cleaning of the system is easier to arrange and, for example, to automate. For example, automated cleaning robots, or the like, can be used for cleaning the surface of the solar panels in the system according to the invention. Cleaning of the surface of the solar panels improves the efficiency of the solar panels.

BRIEF DESCRIPTION OF THE DRAWINGS

In the following, the invention will be described in more detail with reference to the appended drawings, in which.

DETAILED DESCRIPTION OF THE INVENTION

Figure 1:
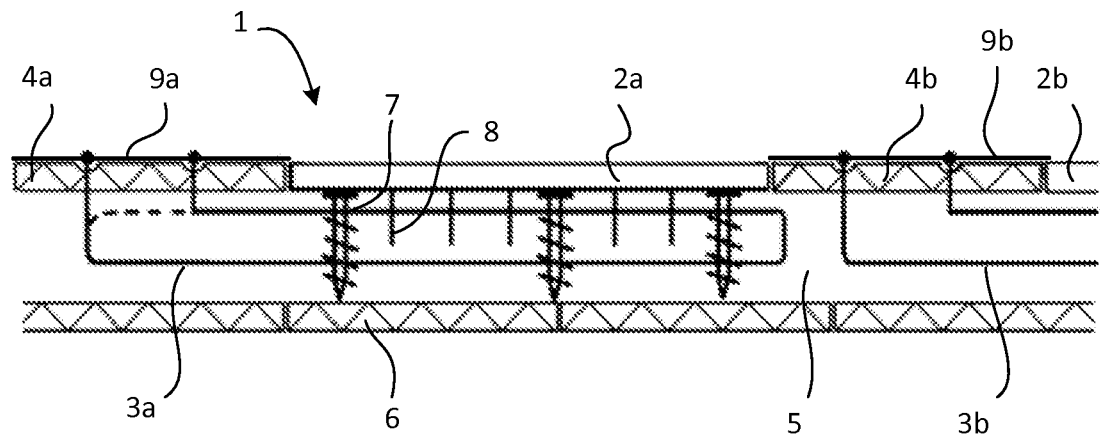
FIG. 1 shows a solar panel system according to an embodiment of the invention, which comprises solar panels and boards of thermal insulation material installed directly on the ground, in parallel with the ground surface, as well as a cooling pipework in the soil layer underneath the solar panels.

A solar panel system according to the invention comprises solar panels and boards of thermal insulation material arranged on the ground, in parallel with the ground surface. A typical solar panel system according to the invention comprises several solar panels arranged on the ground, in parallel with the ground surface. The number of solar panels may be several tens or even hundreds. The system according to the invention makes it possible to construct large solar power plants in an easy and simple way.

In the solar panel system according to the invention, at least some interspaces between the solar panels are provided with a board or boards of thermal insulation material, substantially in parallel with the ground surface, whereby solar panels and boards of thermal insulation material alternate in the solar panel system. Several solar panels may be arranged next to each other, wherein boards of thermal insulation material are arranged in interspaces between the groups of solar panels. Boards of thermal insulation material may be provided in one, two or more layers on top of each other. In an interspace between solar panels or groups of solar panels, one, two or more boards of thermal insulation material may be arranged next to each other. In a typical embodiment of the invention, both the solar panels and the boards of thermal insulation material are on the same plane on the ground surface. In an embodiment of the invention, a coating and/or separate other material layers may be provided on the surface of the boards of thermal insulation material, for protecting the thermal insulation material. In a typical embodiment of the invention, the solar panels and the boards of thermal insulation material constitute a surface extending substantially in parallel with the ground surface, whereby the solar panels or groups of solar panels, and the boards of thermal insulation material alternate in the width and/or length direction of the surface. Typically, the solar panels and the boards of thermal insulation material constitute a uniform surface. In an embodiment of the invention, the solar panels and the boards of thermal insulation material are arranged in their respective rows in the system according to the invention. In this way, the boards of thermal insulation material constitute paths or passages between the rows of solar panels, whereby e.g. maintenance operations are easier to perform.

In the solar panel system according to the invention, the solar panels and the boards of thermal insulation material are installed directly on the ground, whereby there is no space between the ground surface and the solar panels for air to flow on the back of the panels, but the cooling is arranged directly by using the soil bed. Typically, the solar panels and the boards of thermal insulation material are substantially on the ground level. In a typical embodiment, the planar surface of the solar panels is thus transversely oriented towards the sky, but the solar panels may also be installed at an inclined angle directly on the ground so that no air space is left between the solar panels and the ground surface. The installation angle of the solar panels will depend on the geographical location of the solar power plant and the contours of the terrain on which the solar panel system is installed.

In a typical embodiment according to the invention, the solar panels and the boards of thermal insulation material are installed directly on the ground. In an embodiment of the invention, the ground underneath the solar panels comprises a sand bed in which the cooling pipework is installed. The sand bed enables an easy installation of the cooling pipework. However, the soil layer may comprise any soil types which enable the installation of the cooling pipework in the soil layer. In the solar panel system according to the invention, the function of the soil layer is to absorb heat, and therefore, depending on the consistence of the soil layer, the heat absorption capacity of the soil may vary.

In an embodiment of the invention, the solar panels are arranged in mounting racks on the ground, and/or are fastened to anchor brackets embedded in the ground. In an embodiment of the invention, the back side of the solar panels, facing the ground, is provided with structures of metal, or the like, having high thermal conductivity and sinking into the ground, intended to enhance heat transfer from the solar panel into the ground.

In the solar panel system according to the invention, the cooling pipework for cooling the solar panels is arranged in the ground, underneath the solar panels and the boards of thermal insulation material. In an embodiment, the cooling pipework is arranged in a sand bed underneath the solar panels and the boards of thermal insulation material. In the system according to the invention, cooling is based on the transfer of heat from the solar panels to the soil bed. The cooling pipework may comprise cooling pipes in one, two or more subterranean layers. In an advantageous embodiment of the invention, the cooling pipework comprises pipes in at least two different planes substantially in parallel with the ground surface. Alternatively, the cooling pipework may be configured to extend partly or totally in the vertical direction. In this way, heat can be transferred from the solar panels deeper into the ground and/or distributed more evenly in the soil bed, thereby enhancing the cooling. The cooling pipework is dimensioned according to the number of solar panels and thereby the size of the solar power plant. The dimensions of the cooling pipes of the system are also influenced by the climate where the solar panel system is located, as well as the composition and thereby the thermal absorption capacity of the soil. In an embodiment of the invention, the cooling pipework is arranged to form a cooling element having a height of e.g. 0.2 to 2 m in the ground, whereby cooling pipes are provided over substantially the whole height of the soil layer. The cooling pipework may be arranged in parallel with the ground surface and/or vertically. The cooling pipework according to the invention, arranged underneath the solar panels, enables efficient cooling of the solar panels so that the solar panels are cooled over their whole surface area. Depending on the size of the solar panel system, the cooling pipework may comprise several separate cooling medium circulations. In a typical embodiment of the invention, the cooling pipework is arranged substantially over the whole area covered by the solar panels and the boards of thermal insulation material, in the soil layer underneath the solar panels and the boards of thermal insulation material.

In the system according to the invention, cooling pipework is also arranged in at least some of the boards of thermal insulation material on the ground surface. The boards of thermal insulation material on the ground surface may also comprise heat distribution boards on top of the boards of thermal insulation material, for enhancing releasing of heat. The thermal distribution boards are typically arranged to enhance thermal radiation, whereby heat can be efficiently released from the cooling pipework. The cooling medium in the cooling pipework is arranged to circulate in the cooling pipes provided in the boards of thermal insulation material on the ground surface and/or in the heat distribution boards on top of the boards of thermal insulation material on the ground surface, when heat is to be released from the cooling medium circulation.

The cooling pipework is provided with a circulation of a cooling medium, such as water or air or another suitable agent. The cooling medium is circulated in the pipework. The system according to the invention further comprises the pumps and actuators required for arranging the cooling medium circulation. The cooling pipework comprises control means for arranging a cooling medium circulation solely in a cooling pipework underneath the solar panels and the boards of thermal insulation material, or in the cooling pipework underneath the solar panels and the boards of thermal insulation material and the cooling pipes in the boards of thermal insulation material on the ground surface and/or the heat distribution boards on top of the boards of thermal insulation material on the ground surface.

In an embodiment of the invention, a subterranean layer of thermal insulation material is arranged underneath the cooling pipework, whereby the cooling pipework extends between this layer of thermal insulation material and the solar panels and the boards of thermal insulation material arranged on the ground surface. In this way, the efficiency of the cooling can be enhanced. The subterranean layer of thermal insulation material may comprise one, two or more layers of boards of thermal insulation material. In an embodiment of the invention, the subterranean layer of thermal insulation material arranged underneath the cooling pipework is arranged over at least the same area as the solar panels and the boards of thermal insulation material above the ground.

In a preferred embodiment of the invention, the boards of thermal insulation material comprise extruded polystyrene (XPS), expanded polystyrene (EPS), polyurethane (PIR/PUR), and/or polyphenol. In an embodiment of the invention, the subterranean layer of thermal insulation material comprises boards of thermal insulation material made of extruded polystyrene (XPS), expanded polystyrene (EPS), polyurethane (PIR/PUR), and/or polyphenol. In a preferred embodiment of the invention, the boards of thermal insulation material are made of extruded polystyrene (XPS), expanded polystyrene (EPS), polyurethane (PIR/PUR), and/or polyphenol.

In a method for cooling solar panels according to the invention, the cooling medium is typically arranged to circulate solely in the cooling pipework underneath the solar panels and the boards of thermal insulation material when the solar panels are to be cooled during their operation. In this way, heat is transferred from the solar panels to the soil layer underneath them, which is cooler than the solar panels. When heat is to be released from the cooling medium circulation, the cooling medium is also arranged to circulate in the cooling pipes in the boards of thermal insulation material on the ground surface and/or in the heat distribution boards on top of the boards of thermal insulation material on the ground surface. Typically, the cooling medium is also arranged to circulate in the cooling pipes in the boards of thermal insulation material on the ground surface and/or in the heat distribution boards on top of the boards of thermal insulation material on the ground surface when the outdoor temperature is lower than the temperature of the cooling fluid in the cooling pipework, typically during night time. In this way, the cooling medium can be made to release heat from the system, and the soil layer underneath the solar panels can be cooled. In this way, the temperature of the solar panels can be lowered on the next day again, when heat is conveyed from the solar panels to the soil layer underneath the solar panels.

DETAILED DESCRIPTION OF THE FIGURES

Figure 2:
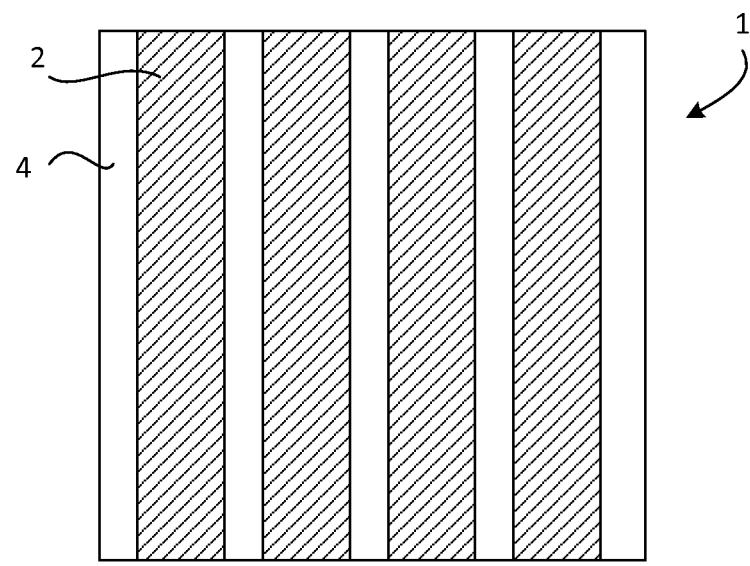
FIG. 2 shows a top view of a solar panel system according to an embodiment of the invention, wherein solar panels and boards of thermal insulation material alternate.

FIG. 1 shows a solar panel system 1 according to an embodiment of the invention, comprising solar panels 2a, 2b installed directly in the ground, in parallel with the plane of the ground surface, and a cooling pipework 3a, 3b in a soil layer 5 underneath the solar panels. The solar panels 2a, 2b and boards of thermal insulation material 4a, 4b are installed directly on the ground 5, whereby the solar panels and the boards of thermal insulation material constitute a surface substantially parallel with the ground surface, in which the solar panels 2a, 2b and the boards of thermal insulation material 4a, 4b alternate. FIG. 2 shows a top view of a solar panel system 1 according to an embodiment of the invention, wherein solar panels and boards of thermal insulation material alternate, forming solar panel rows 2 and interposed passages 4 of boards of thermal insulation material.

A cooling pipework 3a, 3b of the solar panel system 1 is arranged in the soil 5 underneath the solar panels 2a, 2b and the boards of thermal insulation material 4a, 4b, and provided with a cooling medium circulation; and the cooling pipework is also arranged in at least some of the boards of thermal insulation material 4a, 4b on the ground surface. The cooling pipework may comprise several separate cooling circulations, as shown in FIG. 1. The cooling pipework 3a, 3b may comprise pipes on several levels. In FIG. 1, the cooling pipework is arranged on two different levels. The cooling pipework 3a, 3b comprises control means for arranging a cooling medium circulation in only the cooling pipework underneath the solar panels, or in the cooling pipework underneath the solar panels and in the cooling pipes in the boards of thermal insulation material on the ground surface. On top of the boards of thermal insulation material 4a, 4b, a heat distribution board 9a, 9b connected to the cooling pipework 3a, 3b may also be provided to enhance the releasing of heat from the system.

FIG. 1 shows that the solar panel 2a is arranged in mounting racks in the ground, and/or is fastened to anchor brackets 7 embedded in the ground. Furthermore, the back side of the solar panel 2a, facing the ground, is provided with structures 8 of metal, or the like, having high thermal conductivity and sinking into the ground, intended to enhance heat transfer from the solar panel into the ground.

In the embodiment shown in FIG. 1, a subterranean layer of thermal insulation material 6 is provided underneath the cooling pipework 3a, 3b, whereby the cooling pipework 3a, 3b is interposed between this layer of thermal insulation material and the above-ground solar panels 2a, 2b and boards of thermal insulation material 4a, 4b.

The invention claimed is:

1. A solar panel system comprising solar panels and a cooling pipework for cooling the solar panels, wherein the solar panels in the solar panel system are arranged on a ground surface in parallel with the ground surface, and at least some interspaces between the solar panels are provided with one or more boards of a thermal insulation material in parallel with the ground surface, wherein the solar panels and the boards of the thermal insulation material constitute a surface parallel with the ground surface, wherein the solar panels and the boards of thermal insulation material alternate in a width and/or length direction of the ground surface on a same plane, and the cooling pipework of the solar panel system is arranged in a soil layer underneath the solar panels and the one or more boards of the thermal insulation material in the ground surface, whereby a cooling medium circulation is arranged in the cooling pipework, and the cooling pipework is further arranged to extend in at least some of the one or more boards of the thermal insulation material on the surface of the ground and/or is connected to heat distribution boards on top of the one or more boards of the thermal insulation material on the surface of the ground.

2. The solar panel system according to claim 1, wherein the solar panels and the one or more boards of the thermal insulation material are installed directly on the ground.

3. The solar panel system according to claim 1, wherein passages are formed of the one or more boards of the thermal insulation material and arranged between rows of solar panels.

4. The solar panel system according to claim 1, wherein the soil layer underneath the solar panels and the one or more boards of the thermal insulation material comprises a sand bed.

5. The solar panel system according to claim 4, wherein the cooling pipework is arranged in the sand bed.

6. The solar panel system according to claim 1, wherein the solar panels are arranged in mounting racks on the ground and/or are fastened to anchor brackets to be embedded in the ground.

7. The solar panel system according to claim 1, wherein a subterranean layer of the thermal insulation material is arranged underneath the cooling pipework, whereby the cooling pipework extends between the subterranean layer of the thermal insulation material and the solar panels and the one or more boards of the thermal insulation material arranged on the surface of the ground.

8. The solar panel system according to claim 7, wherein the subterranean layer of the thermal insulation material comprises boards of thermal insulation material made of extruded polystyrene (XPS), expanded polystyrene (EPS), polyurethane (PIR/PUR), and/or polyphenol.

9. The solar panel system according to claim 1, wherein the cooling pipework comprises pipes, which are arranged on one level in the soil layer.

10. The solar panel system of claim 9, wherein the cooling pipework comprises pipes, which are arranged on at least two different levels in the soil layer.

11. The solar panel system according to claim 1, wherein a cooling medium circulation is arranged in the cooling pipework solely in the soil layer underneath the solar panels and the one or more boards of the thermal insulation material, or in the cooling pipework in the soil layer underneath the solar panels and the one or more boards of the thermal insulation material and the cooling pipes arranged in the one or more boards of the thermal insulation material on the ground surface and/or in the heat distribution boards on top of the one or more boards of the thermal insulation material on the surface of the ground.

12. The solar panel system according to claim 1, wherein the boards of the thermal insulation material comprise extruded polystyrene (XPS), expanded polystyrene (EPS), polyurethane (PIR/PUR), and/or polyphenol.

13. A method for cooling the solar panel system according to a claim 1, wherein the cooling medium is arranged to circulate in a cooling pipework in the soil layer underneath the solar panels and boards of thermal insulation material when the solar panels are to be cooled during their operation; and the cooling medium is also arranged to circulate in cooling pipework arranged in the boards of thermal insulation material on the ground surface, and/or in heat distribution boards on top of the boards of thermal insulation material on the ground surface, when heat is to be released from the cooling medium circulation.

14. The method according to claim 13, wherein the cooling medium is arranged to circulate in the cooling pipework in the boards of thermal insulation material on the ground surface and/or in the heat distribution boards on top of the boards of thermal insulation material on the ground surface when the outdoor temperature is lower than the temperature of the cooling medium in the cooling pipework.

\* \* \* \* \*